United States Patent
Ogai et al.

(10) Patent No.: US 11,018,479 B2
(45) Date of Patent: May 25, 2021

(54) DISTRIBUTION BOARD

(71) Applicant: MITSUBISHI ELECTRIC CORPORATION, Tokyo (JP)

(72) Inventors: Toshifumi Ogai, Tokyo (JP); Masato Ohara, Tokyo (JP); Daijiro Kondo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 352 days.

(21) Appl. No.: 16/082,796

(22) PCT Filed: Apr. 11, 2016

(86) PCT No.: PCT/JP2016/061679
§ 371 (c)(1),
(2) Date: Sep. 6, 2018

(87) PCT Pub. No.: WO2017/179092
PCT Pub. Date: Oct. 19, 2017

(65) Prior Publication Data
US 2020/0021086 A1 Jan. 16, 2020

(51) Int. Cl.
*H02B 1/04* (2006.01)
*H02B 1/20* (2006.01)
(Continued)

(52) U.S. Cl.
CPC .............. *H02B 1/04* (2013.01); *H02B 1/041* (2013.01); *H02B 1/056* (2013.01); *H02B 1/20* (2013.01); *H02B 1/42* (2013.01); *H02J 1/08* (2013.01)

(58) Field of Classification Search
CPC .......... H02B 1/041; H02B 1/056; H02B 1/04; H02B 1/20
See application file for complete search history.

(56) References Cited

U.S. PATENT DOCUMENTS 3,187,124 A * 6/1965 Stauback ................ H01H 9/22
200/50.15
4,680,672 A * 7/1987 May ........................ H02B 1/48
361/634
(Continued)

FOREIGN PATENT DOCUMENTS

JP S50-150855 A 12/1975
JP H07-36505 U 7/1995
(Continued)

OTHER PUBLICATIONS

International Search Report (PCT/ISA/210) dated Jul. 5, 2016, by the Japan Patent Office as the International Searching Authority for International Application No. PCT/JP2016/061679.
(Continued)

*Primary Examiner* — Robert J Hoffberg
(74) *Attorney, Agent, or Firm* — Buchanan Ingersoll & Rooney PC

(57) ABSTRACT

Provided is a distribution board which includes a plurality of breaker units which are disposed so as to be inserted and removed, through a front side of a housing, in a front-rear direction, relative to a vertical bus disposed on an inner depth side of the housing so as to extend in an up-down direction, the plurality of breaker units being electrically connected to and disconnected from the vertical bus by insertion and removal operation. In the distribution board, the breaker units include a first breaker unit and a second breaker unit that are aligned in line in a horizontal direction and that can be individually inserted and removed, and the vertical bus includes a first vertical bus corresponding to the first breaker unit and a second vertical bus corresponding to the second breaker unit.

5 Claims, 3 Drawing Sheets

(51) Int. Cl.
*H02B 1/42* (2006.01)
*H02B 1/056* (2006.01)
*H02J 1/08* (2006.01)

(56) References Cited

U.S. PATENT DOCUMENTS

| | | | | |
|---|---|---|---|---|
| 4,752,233 | A * | 6/1988 | Morby | H02B 1/056 361/636 |
| 4,945,450 | A * | 7/1990 | Sabatella | H02B 1/056 361/624 |
| 5,172,300 | A * | 12/1992 | Morby | H02B 1/056 361/637 |
| 5,894,404 | A * | 4/1999 | Vrnak | H01H 71/0264 174/545 |
| 5,933,319 | A * | 8/1999 | Buckner | H02B 1/056 200/50.22 |
| 7,558,053 | B2 * | 7/2009 | Moore | H02B 1/21 174/71 B |
| 8,482,905 | B2 * | 7/2013 | Mooney | H01H 9/26 361/637 |
| 8,664,805 | B2 * | 3/2014 | Kwon | H02B 1/20 307/147 |
| 8,817,454 | B2 * | 8/2014 | Morris | H05K 7/02 361/614 |
| 9,437,385 | B1 * | 9/2016 | Mittelstadt | H01H 71/0264 |
| 9,564,741 | B1 * | 2/2017 | Mittelstadt | H01H 71/08 |
| 9,852,866 | B2 * | 12/2017 | Sangawa | H01H 9/22 |
| 10,439,373 | B2 * | 10/2019 | Shindo | H02B 1/056 |

FOREIGN PATENT DOCUMENTS

| | | |
|---|---|---|
| JP | 3113266 U | 9/2005 |
| JP | 2008-211871 A | 9/2008 |
| JP | 2016-082788 A | 5/2016 |
| KR | 101161714 B1 * | 7/2012 |

OTHER PUBLICATIONS

Written Opinion (PCT/ISA/237) dated Jul. 5, 2016, by the Japan Patent Office as the International Searching Authority for International Application No. PCT/JP2016/061679.

* cited by examiner

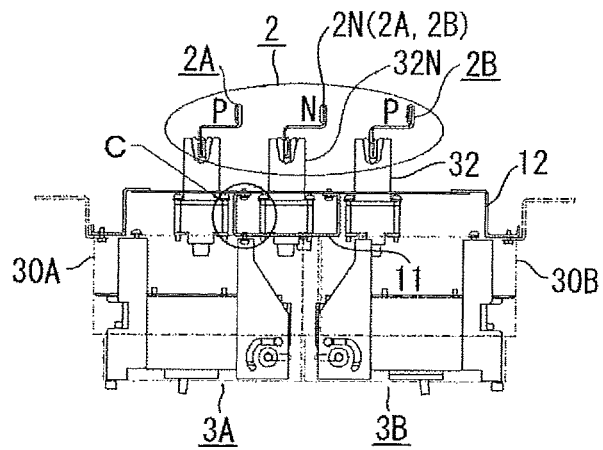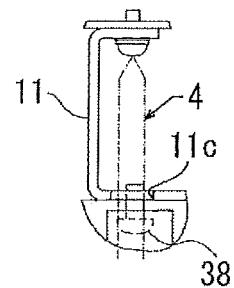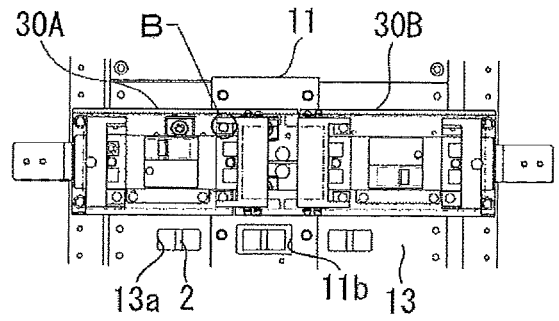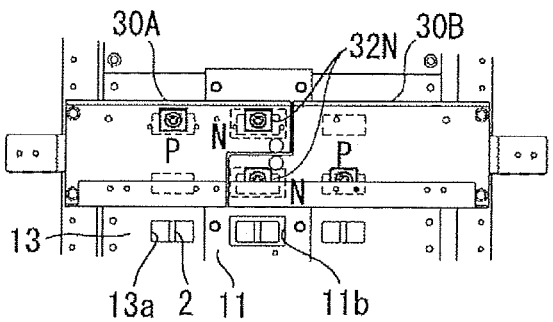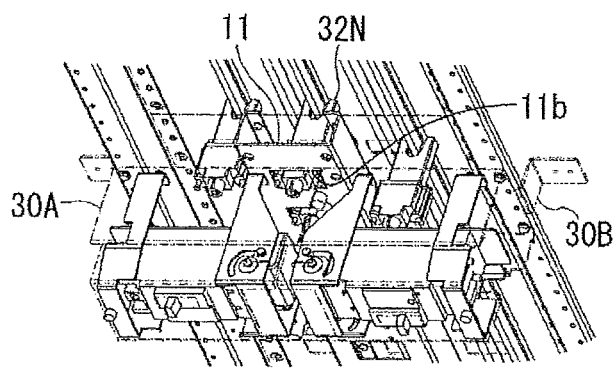
FIG. 3B
FIG. 3E
FIG. 3F
FIG. 3A
FIG. 3D
FIG. 3C

DISTRIBUTION BOARD

BACKGROUND OF THE INVENTION

1. Field of the Invention

The present invention relates to a distribution board which is used for, for example, supply of DC power and which allows a breaker unit having a breaker mounted therein to be individually inserted therein and removed therefrom.

2. Description of the Background Art

As a conventional distribution board, for example, a distribution board unit which has: a rack body for accommodating an AC distribution board unit and a DC distribution board unit; an AC bus bar and a DC bus bar that are disposed on the rear surface side of the rack body; an AC connection portion connected to the AC bus bar; and a DC connection portion connected to the DC bus bar, and in which, when the AC distribution board unit is pushed into the rack body, the AC distribution board unit is accommodated so as to be connected to the AC connection portion, and, when the DC distribution board unit is pushed into the rack body, the DC distribution board unit is accommodated so as to be connected to the DC connection portion, is known (see Patent Document 1).

Patent Document 1: Japanese Utility Model Registration No. 3113266 (page 1, FIG. 1)

The distribution board having the above-described structure facilitates extension operation because the distribution board unit is electrically connected to a corresponding bus bar only by being inserted into the rack body. However, in a case where a load system is different among a plurality of breakers mounted in one unit, when an operation of, for example, inspecting or changing a specific breaker only needs to be performed, a problem arises that an irrelevant system needs to be stopped.

SUMMARY OF THE INVENTION

The present invention has been made in order to solve the aforementioned problem, and an object of the present invention is to provide a distribution board that has a structure in which one breaker is provided in one unit, and that allows maintainability to be improved.

A distribution board according to the present invention includes a plurality of breaker units which are disposed so as to be inserted and removed, through a front side of a housing, in a front-rear direction, relative to a vertical bus disposed on an inner depth side of the housing so as to extend in an up-down direction, the plurality of breaker units being electrically connected to and disconnected from the vertical bus by insertion and removal operation. In the distribution board, the breaker units include a first breaker unit and a second breaker unit that are aligned in line in a horizontal direction and that can be individually inserted and removed, and the vertical bus includes a first vertical bus corresponding to the first breaker unit and a second vertical bus corresponding to the second breaker unit.

According to the present invention, the first breaker unit and the second breaker unit that are aligned in line in the horizontal direction and that can be individually inserted and removed are provided, and the first vertical bus corresponding to the first breaker unit and the second vertical bus corresponding to the second breaker unit are provided. Therefore, only any corresponding breaker unit can be, for example, inspected or changed, whereby workability for maintenance is improved, and an operation time is reduced. Furthermore, a breaker unit which does not require maintenance, and a load system thereof need not be handled or the operation thereof need not be stopped. Therefore, unnecessary time loss can be avoided.

BRIEF DESCRIPTION OF THE DRAWINGS

FIG. 3A to FIG. 3F illustrate a structure of a main portion of a distribution board, for supply of DC power, according to a second embodiment of the present invention.

DETAILED DESCRIPTION OF THE PREFERRED EMBODIMENTS OF THE INVENTION

First Embodiment

Figure 1A:
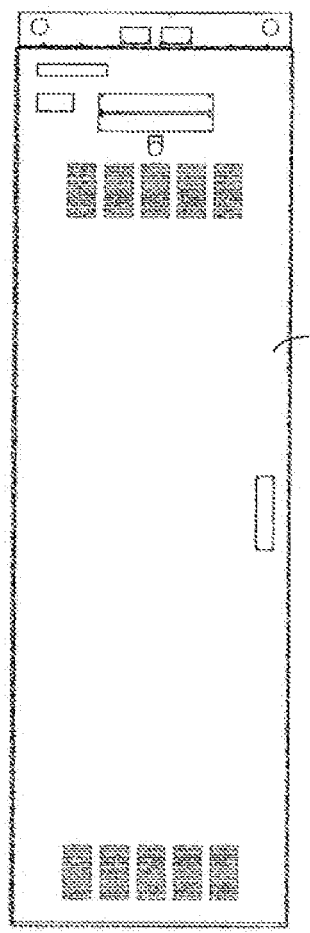
FIG. 1A and FIG. 1B illustrate an entire structure of a distribution board, for supply of DC power, according to a first embodiment of the present invention.
Figure 1B:
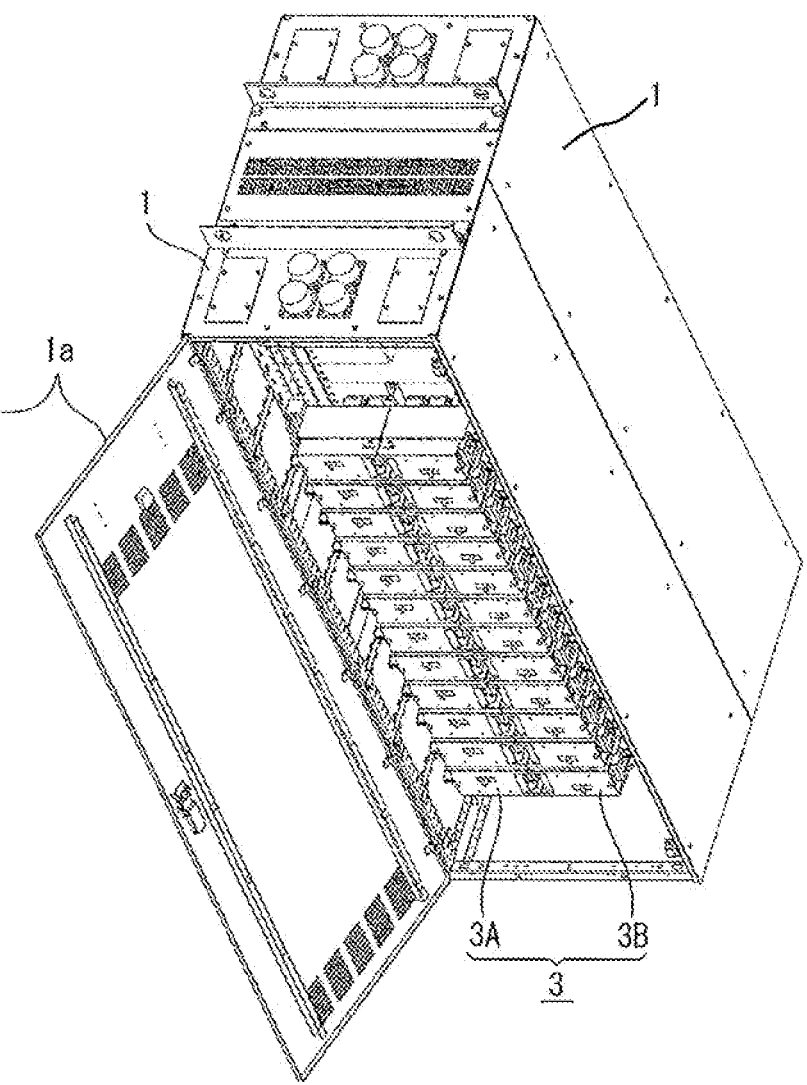
Figure 2B:
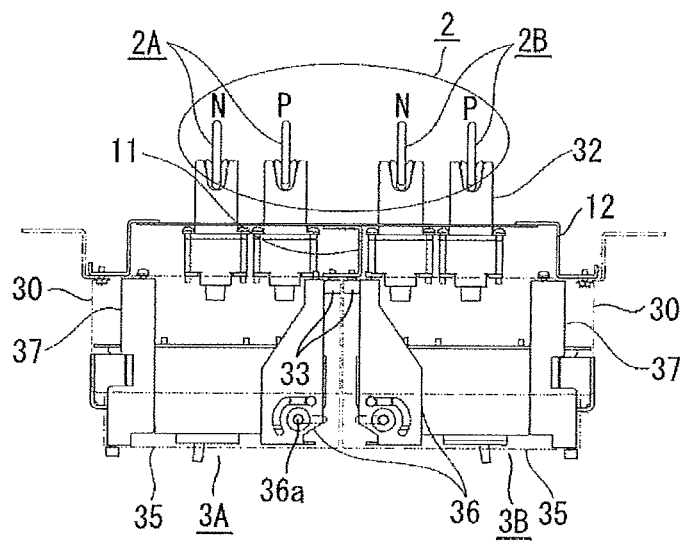
FIG. 2A to FIG. 2E illustrate a structure of a main portion of the distribution board, for supply of DC power, shown in FIG. 1A and FIG. 1B.
Figure 2A:
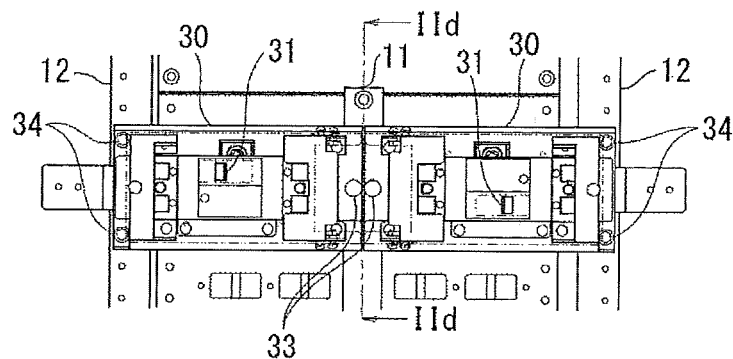
Figure 2D:
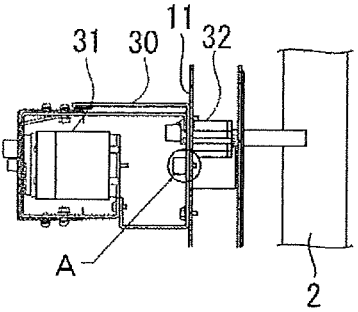
Figure 2C:
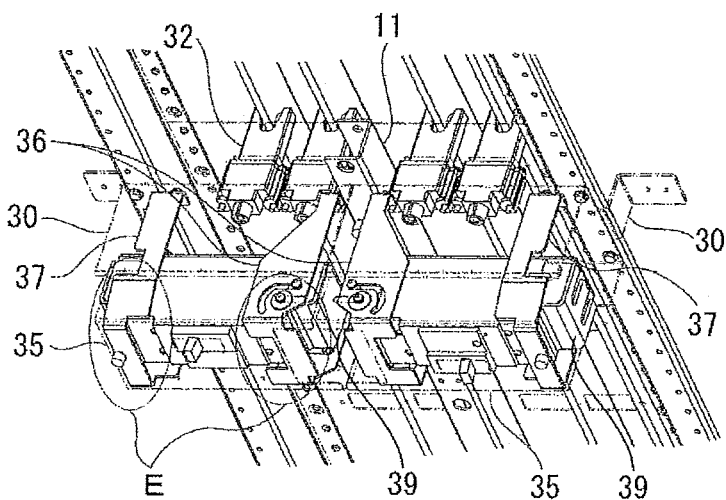
Figure 2E:
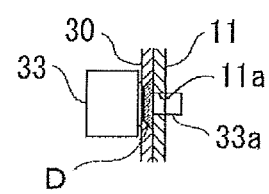

FIG. 1A and FIG. 1B illustrates an entire structure of a distribution board, for supply of DC power, according to a first embodiment of the present invention. FIG. 1A is a front view of the distribution board, and FIG. 1B is a perspective view thereof. FIG. 2A to FIG. 2E illustrates a structure of a main portion of the distribution board, for supply of DC power, shown in FIG. 1A and FIG. 1B. FIG. 2A is a main portion front view of a portion where one breaker unit is mounted on each of the left and the right sides, FIG. 2B is a plan view thereof, FIG. 2C is a perspective view thereof, FIG. 2D schematically illustrates a cross-sectional structure as seen from the direction of arrows IId-IId in FIG. 2A, and FIG. 2E illustrates in detail an encircled portion A in FIG. 2D. In the drawings, the distribution board for supply of DC power includes: a housing 1 having a door 1a on the front surface side; a vertical bus 2 having a first vertical bus 2A and a second vertical bus 2B supported on the inner depth side of the housing 1 in an insulated state so as to extend in the up-down direction; and a first breaker unit 3A and a second breaker unit 3B that can be individually inserted and removed relative to the vertical bus 2 through the front side of the housing 1 in the front-rear direction and that are each electrically connected to or disconnected from the corresponding vertical bus 2 by the insertion and removal operation.

In the example shown in FIG. 1A and FIG. 1B, in appearance, the multiple first breaker units 3A and the multiple second breaker units 3B are arranged in the up-down direction in one housing 1 so as to form a pair of left and right units, and two housings 1 having the same structure are joined so as to be disposed back to back, and a plurality of breaker units are mounted also on the rear surface side. The vertical bus 2 for supplying power to the breaker unit 3 has four buses in total, that is, an N-phase (negative) bus (represented as "N") and a P-phase (positive) bus (represented as "P") of the first vertical bus 2A for the first breaker unit 3A on the left side in FIG. 2B, and an N-phase bus and a P-phase bus of the second vertical bus 2B for the second breaker unit 3B on the right side in FIG. 2B. If the vertical bus 2 has a crank-shaped (Z-shaped) cross-section, insulation distance is difficult to assuredly obtain when the four buses are aligned in the horizontal direction.

Therefore, in the present embodiment, as shown in FIG. 2B, a flat conductor bus is used. A power supply grip 32 that is a bus connecting member that connects between the primary side portion of a breaker 31 and the vertical bus 2 by the breaker unit 3 being inserted is provided such that two power supply grips 32 each of which is for a single phase are mounted per one breaker unit and each power supply grip 32 holds the vertical bus 2 from both sides thereof as shown in FIG. 2B.

The first breaker unit 3A and the second breaker unit 3B are structured so as to be plane-symmetric except for polarity arrangement of the power supply grips 32 and a direction in which the breaker 31 is mounted, and the structures are substantially the same on the left and the right sides. Therefore, in a case where they need not be particularly distinguished from each other, the first and the second breaker units are each referred to simply as "breaker unit 3". Also in a case where the first vertical bus 2A and the second vertical bus 2B' need not be particularly distinguished from each other, the first and the second vertical buses are each referred to simply as "vertical bus 2".

The breaker units 3 are independent of each other, and can be individually inserted and removed. One breaker 31 is provided in one breaker unit 3. The primary side portion of the breaker 31 is connected to the power supply grip 32 by a not-illustrated cable, and the secondary side portion of each breaker 31 is connected, by a not-illustrated cable, to a predetermined branch circuit outside the board via a wiring duct in the board. The primary side cable may be a conductor.

A frame 11 for fixing the center side portion of the breaker unit 3 that has been inserted from the front side is disposed at the center portion of the board in the housing 1. The center side portion of the breaker unit 3 is fixed on the primary side of the breaker 31, and, therefore, a commercially available panel fastener 33 as fixing means having a screw fall preventing function is used. The panel fastener 33 has a cross-shaped engagement hole (not shown) that engages with a plus driver, in a screw head axial portion of an incorporated screw. A male screw 33a is threaded on the axial portion connecting with the screw head, and a body (retainer) that holds a portion around the screw in a loosely fitting state is caulked and fixed, at a portion indicated by diagonal lines D in FIG. 2E, with respect to a unit base 30, and, therefore, is not removed from the unit base 30.

The panel fastener 33 has such a mechanism that the screw slides relative to the retainer in the axial direction in a predetermined range. The screw head is rotated while being pushed forward, whereby the male screw 33a of the panel fastener 33 is screwed into a female screw 11a that is threaded in the frame 11, to fix the unit base 30 to a fixing portion of the frame 11. The secondary side portion of the breaker unit 3 is fixed by a screw 34 to a fixing portion provided in a fixing frame 12 in the board.

On the front side of the breaker unit 3, a protection cover 35 that is formed by a coated steel metal is disposed, and the protection cover 35 is slidably and rotatably engaged with a hinge 36a provided in a fastening metal 36 that doubles as a handle at the center side for insertion and removal. The protection cover 35 is shown so as to be see-through. On the secondary side of the breaker unit 3, a fastening metal 37 that doubles as a handle at the outer side for insertion and removal is disposed, and the fastening metal 37 fixes a portion, of the protection cover 35, on a side opposite to the hinge side. The fastening metals 36 and 37 each have such a shape as to allow a finger tip to be easily caught such that portions surrounded by ellipses E shown in FIG. 2C act as the handles. Thus, both end portions of the breaker unit 3 can be held by a hand, thereby stably performing insertion and removal. Both the fastening metals 36 and 37 are fixed to the unit base 30. A transparent cover 39 is provided at a charging portion on each of the primary side and the secondary side of the breaker 31 as shown in FIG. 2C, and protects the charging portion to assure security, and allows, for example, discoloration of a terminal to be visually checked with ease during inspection or the like.

As described above, in the first embodiment, as shown in FIG. 2A to FIG. 2E, the unit base 30 is divided into two portions that are a right portion and a left portion, and the breaker unit 3 includes the first breaker unit 3A and the second breaker unit 3B such that the breaker unit 3 can be individually inserted and removed for each breaker 31. The four vertical buses 2 are provided in order to separate the N-phase and the P-phase of the breaker unit 3 on the right side from the N-phase and the P-phase of the breaker unit 3 on the left side. The N-phase and the P-phase buses on the left side supply power to the first breaker unit 3A on the left side, and the N-phase and the P-phase buses on the right side supply power to the second breaker unit 3B on the right side. The frame 11 is mounted at the center of the board, and fixes the primary side portions of the breaker units 3 on the left and the right sides, and the fastening metals 36 and 37 are mounted, as components acting as handles, on both the end portions of each breaker unit 3, thereby stably holding the breaker unit 3 during insertion and removal.

According to the first embodiment having the above-described structure, an operation of, for example, inspecting or changing a specific breaker only can be performed, thereby improving workability during maintenance. Furthermore, a breaker unit which does not require maintenance, or a load system thereof need not be handled or the operation thereof need not be stopped. Therefore, secondary influence due to maintenance operation is reduced, e.g., unnecessary time loss can be avoided. Furthermore, a significant effect can be obtained, e.g., an operation time required for maintenance is reduced, and replacement of devices and components can be minimized.

Second Embodiment

FIG. 3A to FIG. 3F illustrates a structure of a main portion of a distribution board, for supply of DC power, according to a second embodiment of the present invention. FIG. 3A is a main portion front view of a portion where one breaker unit is mounted on each of the left and the right sides, FIG. 3B is a plan view thereof, FIG. 3C is a perspective view thereof, FIG. 3D illustrates a positional relationship between a unit base and a grip in the front view of FIG. 3A, without showing the other members, FIG. 3E illustrates in detail an encircled portion B in FIG. 3A, and FIG. 3F illustrates in detail an encircled portion C in FIG. 3B. In the second embodiment, while the breaker units 3A and 3B on the left and the right sides are each independent, the vertical bus 2 having a crank-shaped (Z-shaped) cross-section can be used. In the drawings, the first vertical bus 2A and the second vertical bus 2B include three vertical buses in total, that is, a common N-phase bus 2N which is disposed at the center portion in the horizontal direction so as to be shared by the first breaker unit 3A and the second breaker unit 3B, a P-phase bus that forms the first vertical bus 2A and that is disposed to the left of the common N-phase bus 2N as viewed from the front side, and a P-phase bus that forms the second vertical bus 2B and that is disposed to the right of the common N-phase bus 2N as viewed from the front side.

In the unit base 30A that forms the first breaker unit 3A on the left side, a right lower portion, as viewed from the front side, having a predetermined size is cut out such that the unit base 30A forms a stepped shape as shown in FIG. 3D. In the unit base 30B on the right side, a left upper portion having a size corresponding to the above-described cut-out portion of the unit base 30A is cut out such that the unit base 30B forms a stepped shape. The upper half portion on one side and the lower half portion on the other side are formed at different levels so as to be aligned with each other. An N-phase grip 32N is disposed on each of the rear surface sides of the counterpart unit bases 30 disposed in spaces obtained by the cut-out, and the one common N-phase bus 2N disposed at the center portion is shared. The two N-phase grips 32N for the upper portion and the lower portion are required, in a space for one breaker unit 3, for a breaker unit pair of the breaker units 3A and 3B on the left and the right sides. Therefore, as shown in FIG. 3D, two upper and lower through holes 11b are formed in the frame 11 at the center so as to correspond to the two grips, and a VB (vertical bus) cover 13 also has a pair of upper and lower through holes 13a formed at positions corresponding to the through holes 11b.

As shown in FIG. 3E and FIG. 3F, there is a point at which a fixing screw 38 that projects from the breaker unit 3 in the depth direction, and the frame 11 at the center overlap each other. When the frame 11 is mounted, interference between the frame 11 and the screw 38 is avoided by aligning a through hole 11c for a driver 4 with the position of the screw 38. The other components are the same as described for the first embodiment.

As described above, in the second embodiment, while the common N-phase bus 2N, for supply of DC power, which is shared by the first breaker unit 3A and the second breaker unit 3B is disposed at the center portion, in the horizontal direction, of the housing 1, the first vertical bus 2A includes the above-described common N-phase bus 2N and the P-phase bus disposed to the left of the common N-phase bus 2N, and the second vertical bus 2B includes the above-described common N-phase bus 2N and the P-phase bus disposed to the right of the common N-phase bus 2N. Furthermore, the opposing portions of the first breaker unit 3A and the second breaker unit 3B are cut so as to be stepped such that the upper half portion on one side and the lower half portion on the other side are formed at different levels so as to be aligned with each other. Moreover, the N-phase grip 32N that is a bus connecting member which is connected to and disconnected from the common N-phase bus 2N is disposed on each of the rear surface side of the upper half portion (projection) and the rear surface side of the lower half portion in the alignment portion.

In the second embodiment having the above-described structure, the common N-phase bus 2N at the center is shared by the breaker units 3 on the left and the right sides, so that a conventional bus structure (three Z-shaped buses) can be maintained, thereby reducing cost for materials. Furthermore, a conventional vertical bus structure can be used, thereby standardizing components and reducing the number of assembling steps. An operation of, for example, inspecting or changing any corresponding breaker unit only can be performed without changing a conventional housing structure, thereby improving maintainability. Since the other breaker units need not be handled, an operation time is reduced, and replacement of devices and components can be minimized.

It is noted that, within the scope of the present invention, a part or the entirety of the above embodiments may be freely combined, or each of the above embodiments may be modified or abbreviated as appropriate. For example, although the distribution board is for supply of DC power in each embodiment, the distribution board may be for supply of AC power.

DESCRIPTION OF THE REFERENCE CHARACTERS 1 housing
1a door
11 frame
11a female screw
11b through hole
11c through hole
12 fixing frame
13 VB (vertical bus) cover
13a through hole
2 vertical bus
2A first vertical bus
2B second vertical bus
2N common N-phase bus
3 breaker unit
3A first breaker unit
3B second breaker unit
30 unit base
30A unit base
30B unit base
31 breaker
32 power supply grip
32N N-phase grip
33 panel fastener
33a male screw
34 screw
35 protection cover
36 fastening metal
36a hinge
37 fastening metal
38 screw
39 transparent cover
4 driver

What is claimed is:
1. A distribution board comprising:
a plurality of breaker units which are disposed so as to be inserted and removed, through a front side of a housing, in a front-rear direction, relative to a vertical bus disposed on an inner depth side of the housing so as to extend in an up-down direction, the plurality of breaker units being electrically connected to and disconnected from the vertical bus by insertion and removal operation, wherein
the breaker units include a first breaker unit and a second breaker unit that are aligned in line in a horizontal direction and that can be individually inserted and removed, and
the vertical bus includes a first vertical bus corresponding to the first breaker unit and a second vertical bus corresponding to the second breaker unit, and
the first vertical bus includes:
a common negative bus, for supply of DC power, which is disposed at a center in the horizontal direction so as to be shared by the first breaker unit and the second breaker unit; and
a first positive bus disposed on one side of the common negative bus, and the second vertical bus includes the common negative bus, and a second positive bus disposed on another side of the common negative bus, wherein opposing portions of each of the first breaker unit and the second breaker unit are cut so as to be stepped such that an upper half portion of the first breaker unit and a lower half portion of the second breaker unit are formed at different levels so as to be aligned with each other, and a bus connecting member which is connected to and disconnected from the common negative bus is disposed on each of a rear surface side of the upper half portion of the first breaker unit and a rear surface side of the lower half portion of the second breaker unit.

2. The distribution board according to claim 1, wherein each of the common negative bus, the first positive bus that forms the first vertical bus, and the second positive bus that forms the second vertical bus has a crank-shaped cross-section.

3. The distribution board according to claim 2, wherein a transparent cover is disposed on each of charging portions on a primary side and a secondary side of each of the first breaker unit and the second breaker unit.

4. The distribution board according to claim 1, wherein a transparent cover is disposed on each of charging portions on a primary side and a secondary side of each of the first breaker unit and the second breaker unit.

5. The distribution board comprising: according to claim 1,
wherein the first breaker unit includes a first power supply grip which electrically connects the first breaker unit to the common negative bus by holding the common negative bus from both sides thereof, and a second power supply grip which electrically connects the first breaker unit to the first positive bus of the first vertical bus by holding the first positive bus of the first vertical bus from both sides thereof, and
wherein the second breaker unit includes a third power supply grip which electrically connects the second breaker unit to the common negative bus by holding the common negative bus from both sides thereof, and a fourth power supply grip which electrically connects the second breaker unit to the second positive bus of the second vertical bus by holding the second positive bus of the second vertical bus from both sides thereof.

* * * * *